(12) United States Patent
Chen et al.

(10) Patent No.: US 10,885,914 B2
(45) Date of Patent: Jan. 5, 2021

(54) SPEECH CORRECTION SYSTEM AND SPEECH CORRECTION METHOD

(71) Applicant: Quanta Computer Inc., Taoyuan (TW)

(72) Inventors: Kuan-Chung Chen, Taoyuan (TW); Chih-Wei Sung, Taoyuan (TW); Yu-Cheng Chien, Taoyuan (TW); Yi-Ling Chen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 106 days.

(21) Appl. No.: 16/255,943

(22) Filed: Jan. 24, 2019

(65) Prior Publication Data

US 2020/0118561 A1 Apr. 16, 2020

(30) Foreign Application Priority Data

Oct. 12, 2018 (TW) .............................. 107135879 A (51) Int. Cl.
  *G10L 15/22* (2006.01)
  *G10L 15/30* (2013.01)
  *G10L 15/14* (2006.01)

(52) U.S. Cl.
  CPC .............. *G10L 15/22* (2013.01); *G10L 15/14* (2013.01); *G10L 15/30* (2013.01)

(58) Field of Classification Search
  CPC ................................ G10L 15/19; G10L 15/22
  USPC ........................................................ 704/240
  See application file for complete search history.

(56) References Cited

U.S. PATENT DOCUMENTS

| | | | | |
|---|---|---|---|---|
| 7,313,526 B2* | 12/2007 | Roth | ....................... | G10L 15/19 704/253 |
| 7,444,286 B2* | 10/2008 | Roth | ....................... | G10L 15/22 704/270 |
| 7,505,911 B2* | 3/2009 | Roth | ....................... | G10L 15/22 379/88.03 |
| 7,577,569 B2* | 8/2009 | Roth | ....................... | G10L 15/19 704/235 |
| 7,634,403 B2* | 12/2009 | Roth | ....................... | G10L 15/22 704/235 |
| 7,716,058 B2* | 5/2010 | Roth | ....................... | G10L 15/19 704/277 |
| 7,809,574 B2* | 10/2010 | Roth | ....................... | G10L 15/14 704/270 |

(Continued)

*Primary Examiner* — Susan I McFadden
(74) *Attorney, Agent, or Firm* — McClure, Qualey & Rodack, LLP (57) ABSTRACT

The speech correction system includes a storage device and a processing device. The storage device stores a first database. The processing device includes an audio receiver, a speech recognition engine, a calculation module, and a determination module. The audio receiver receives multiple voice inputs. The speech recognition engine recognizes the voice inputs, generates multiple candidate vocabularies corresponding to each of the voice inputs, and generates a vocabulary probability corresponding to each of the candidate vocabularies. The calculation module performs a specific operation on the vocabulary probabilities corresponding to the same candidate vocabulary, to generate a plurality of corresponding operation results. The determination module determines whether each of the operation results is greater than a score threshold, and stores at least one output result that is greater than the score threshold to the first database.

9 Claims, 5 Drawing Sheets

(56) References Cited

U.S. PATENT DOCUMENTS

| | | | | |
|---|---|---|---|---|
| 8,886,545 B2* | 11/2014 | Meisel | ................... | G10L 15/08 |
| | | | | 704/275 |
| 8,949,266 B2* | 2/2015 | Phillips | .................. | G10L 15/30 |
| | | | | 707/769 |
| 9,495,956 B2* | 11/2016 | Meisel | ................... | G06F 3/167 |
| 10,679,610 B2* | 6/2020 | Malhotra | .............. | G06F 40/166 |
| 2011/0131038 A1* | 6/2011 | Oyaizu | ................... | G10L 15/06 |
| | | | | 704/10 |
| 2012/0173574 A1* | 7/2012 | Homma | ................. | G06F 16/68 |
| | | | | 707/772 |

\* cited by examiner

SPEECH CORRECTION SYSTEM AND SPEECH CORRECTION METHOD

CROSS-REFERENCE TO RELATED APPLICATION

This application claims priority to Taiwan Application Serial Number 107135879, filed Oct. 12, 2018, which is incorporated herein by reference.

BACKGROUND

Technical Field

The present invention relates to a system for receiving speech, and in particular to a speech correction system and a speech correction method.

Description of the Related Art

Existing speech recognition models, such as the Google Speech API, are generated through training a large amount of speech data. However, since each person's accent is slightly different, this may result in incorrect recognition results.

In addition, the voice interaction mode that currently exists uses a specific command to communicate and interact. However, the recognition error often happens due to the different accents mentioned above, which makes it difficult for the user to use the interaction function through voice.

For example, the Android operating system uses specific commands, such as "OK Google," as the default voice to invoke the Google search engine. When the user says "OK Google" and the speech recognition model recognizes the voice as "OK Google", the Google search engine is invoked because it is the same as the preset "OK Google" command. In the above process, if the speech recognition model recognizes the voice as other speech due to the difference in the user's accent, for example, as "OK Geegle", the Google search engine is not invoked because it is different from the preset "OK Google" command.

Therefore, the existing methods described above still need to be improved further.

BRIEF SUMMARY

An embodiment of the invention introduces a speech correction system. The speech correction system includes a storage device and a processing device. The storage device is configured to store a first database. The processing device includes an audio receiver, a speech recognition engine, a calculation module, and a determination module. The audio receiver is configured to receive a plurality of voice inputs. The speech recognition engine is configured to recognize the voice inputs, generate a plurality of candidate vocabularies corresponding to each of the voice inputs, and generate a vocabulary probability corresponding to each of the candidate vocabularies. The calculation module is configured to perform a specific operation on the vocabulary probabilities corresponding to the same candidate vocabulary, to generate a plurality of corresponding operation results. The determination module is configured to determine whether each of the operation results is greater than a score threshold, and store at least one output result that is greater than the score threshold to the first database.

An embodiment of the invention introduces a speech correction method. The speech correction method comprises: receiving a plurality of voice inputs; recognizing the voice inputs, generating a plurality of candidate vocabularies corresponding to each of the voice inputs, and generating a vocabulary probability corresponding to each of the candidate vocabularies; performing a specific operation on the vocabulary probabilities corresponding to the same candidate vocabulary to generate a plurality of corresponding operation results; and determining whether each of the operation results is greater than a score threshold, and storing at least one output result that is greater than the score threshold to a first database.

The speech correction system and the speech correction method of the present invention can recognize new voices according to different accents. It can provide customized semantics for different users. In addition, by storing the output results in different databases through different commands, the efficiency of recognizing the semantic meaning that the user really wants to express can be improved when a new voice is recognized.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It should be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
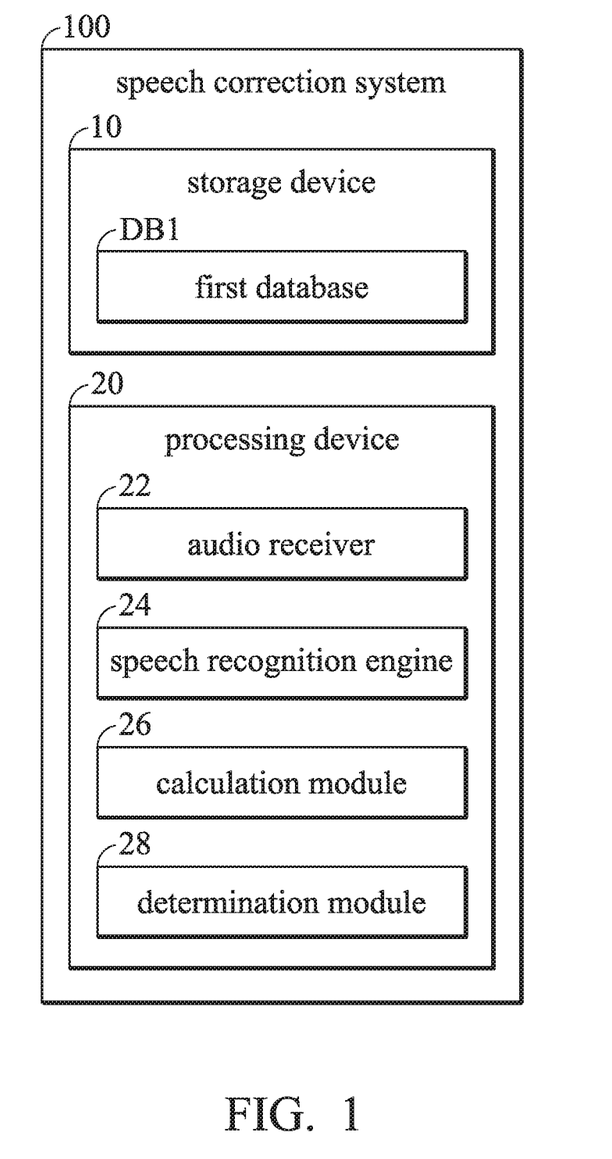
FIG. 1 is a block diagram of a speech correction system according to an embodiment of the present invention.
Figure 2:
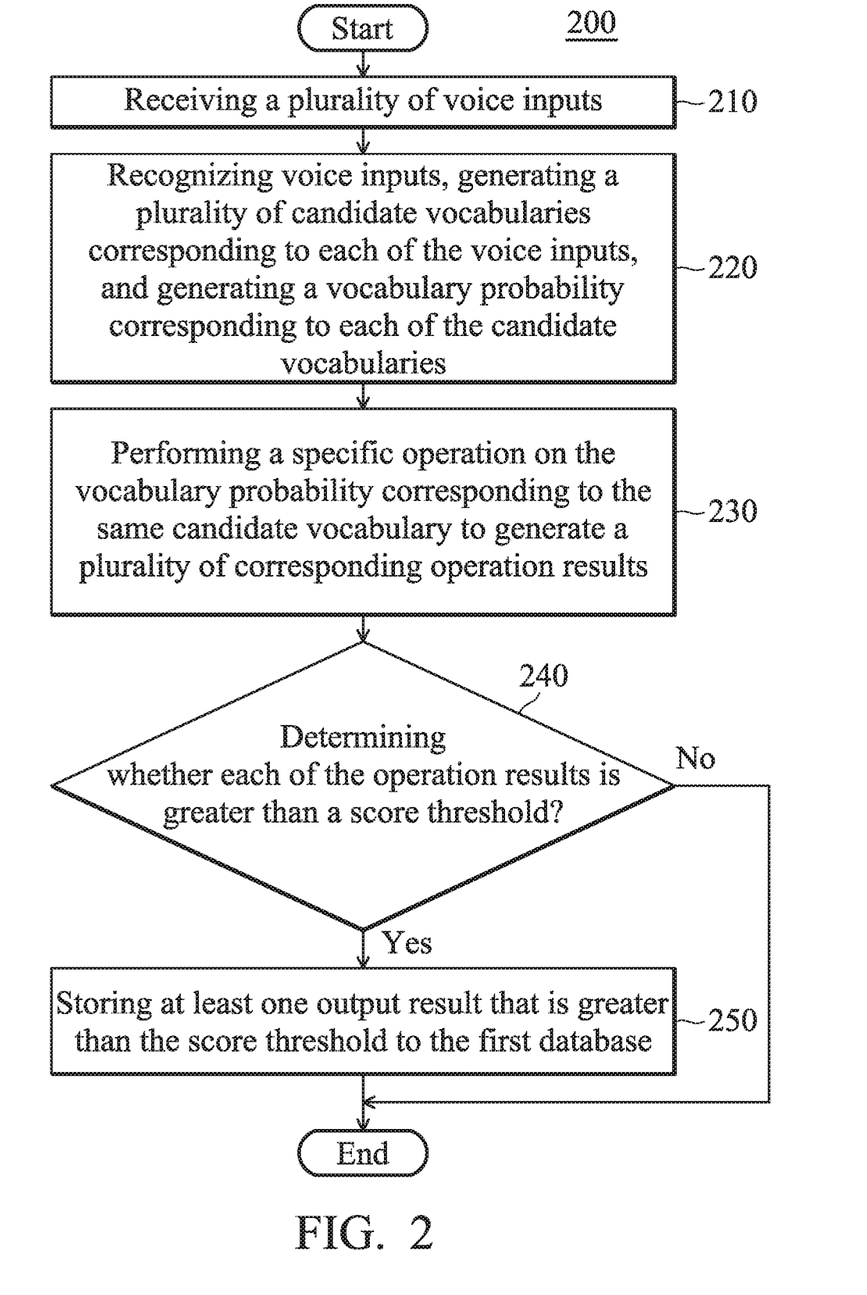
FIG. 2 is a flow chart of a speech correction method according to an embodiment of the present invention.

Please refer to FIGS. 1-2. FIG. 1 is a block diagram of a speech correction system 100 according to an embodiment of the present invention. FIG. 2 is a flow chart of a speech correction method 200 according to an embodiment of the present invention.

As shown in FIG. 1, the speech correction system 100 includes a storage device 10 and a processing device 20. The storage device 10 is configured to store a first database DB1. The processing device 20 includes an audio receiver 22, a speech recognition engine 24, a calculation module 26, and a determination module 28.

In one embodiment, the storage device 10 can be implemented by a read-only memory, a flash memory, a floppy disk, a hard disk, an optical disk, a flash disk, a magnetic tape, a database accessible via a network, or a storage medium that can be easily conceived of by those of ordinary skill in the art and has the same function. In one embodiment, the storage device 10 is used to store the database DB1 (as shown in FIG. 1). The database DB1 can store at least one default command, such as "open fridge", for enabling a specific application.

In one embodiment, the audio receiver 22 is used to receive a plurality of voice commands. In one embodiment, the audio receiver 22 can be a microphone or another device having a radio function. In one embodiment, the audio receiver 22 can be placed outside of the processing device 20.

In one embodiment, the processing device 20 can be any electronic device having a calculation function. In one embodiment, the speech recognition engine 24, the calculation module 26, and the determination module 28 can be individually or collectively implemented by, for example, a microcontroller, a microprocessor, a digital signal processor, an application specific integrated circuit (ASIC), or a logic circuit.

In one embodiment, referring to FIG. 2, in step 210, the audio receiver 22 is configured to receive a plurality of voice inputs. In one embodiment, the speech correction system 100 instructs the user to speak the command 5 times, for example, repeating "open fridge" 5 times, to the audio receiver 22 through the user interface. The audio receiver 22 receives these voice inputs. The so-called command refers to the system as the default voice command to enable specific actions, such as the "open fridge" example above, can be set to enable a specific application.

In one embodiment, these voice inputs received by the audio receiver 22 represent the same meaning as the correct meaning. As mentioned above, the user speaks "open fridge" 5 times, and even if the pronunciation is not always accurate, the purpose is to enable a voice application of refrigerator management application, for example.

In step 220, the speech recognition engine 24 is configured to recognize voice inputs, generate a plurality of candidate vocabularies corresponding to each of the voice inputs, and generate a vocabulary probability corresponding to each of the candidate vocabularies. In one embodiment, the speech recognition engine 24 can be implemented by using known speech recognition software, and therefore will not be described again here.

In one embodiment, the speech recognition engine 24 recognizes one of the voice inputs (for example, the voice input of the user for the first time, that is, the voice input of the "open fridge" command), and the recognition result is, for example, at least one candidate vocabulary, such as "open French" or "open fridge" and, "open in French", etc., and the vocabulary probabilities that separately correspond to the candidate vocabularies are: "open French" (candidate vocabulary) corresponding to a vocabulary probability of 0.95, "open fridge" (candidate vocabulary) corresponding to a vocabulary probability of 0.92, and "open in French" (candidate vocabulary) corresponding to a vocabulary probability of 0.89.

In other words, the speech recognition engine 24 recognizes each voice inputs one by one. Each of the recognition generates at least one candidate vocabulary with corresponding vocabulary probability.

In step 230, the calculation module 26 is configured to perform a specific operation on the vocabulary probabilities corresponding to the same candidate vocabulary, to generate a plurality of corresponding operation results.

For example, the speech recognition engine 24 recognizes that the recognition results of the voice inputs by the user 5 times, in which the recognition results include the candidate vocabulary of "open fridge" 3 times, the candidate vocabulary of "open French" 5 times, the candidate vocabulary of "open in French" 3 times, and the candidate vocabulary of "open cartridge" 2 times. The calculation module 26 adds the vocabulary probabilities corresponding to the same candidate vocabulary, for example, the adding result of "open fridge" is 2.46 (3 times of the 5 recognition results, and the vocabulary probabilities corresponding to the 3 recognition results are respectively 0.82, 0.81, and 0.83, which the calculation module 26 adds together to obtain a value of 2.46.). The adding result of "open French" is 3.67 (5 times of the 5 recognition results, and the vocabulary probabilities corresponding to the 5 recognition results are respectively 0.73, 0.81, 0.82, 0.70 and 0.61, which the calculation module 26 adds up to obtain a value of 3.67). The adding result of "open in French" is 1.92 (3 times of the 5 recognition results, and the vocabulary probabilities corresponding to the 3 recognition results are respectively 0.64, 0.64 and 0.64, which the calculation module 26 adds together to obtain a value of 1.92). The adding result of "open cartridge" is 0.96 (2 times of the 5 recognition results, and the vocabulary probabilities corresponding to the 2 recognition results are respectively 0.49 and 0.40, which the calculation module 26 adds together to obtain a value of 0.89).

In one embodiment, the calculation module 26 performs the specific operation to add the vocabulary probabilities that correspond to the same candidate vocabulary, calculate the average value of the vocabulary probabilities corresponding to the same candidate vocabulary or other mathematical operation, so as to generate operation results.

In step 240, the determination module 28 is configured to determine whether each of the operation results is greater than a score threshold.

In one embodiment, the score threshold (e.g., 3) is obtained by multiplying the number of times of the voice inputs received by the audio receiver 22 (for example, 5 times) by a confidence level (for example, 0.6). In one embodiment, the confidence level is between 0 and 1, which can be set according to the actual operating environment.

In general, a higher confidence level, or a higher number of voice inputs, can make the score threshold higher, which in turn makes the operation results harder to exceed the score threshold. Therefore, a more accurate voice analysis result can be obtained. For example, when the score threshold is set to 3, the determination module 28 only selects the candidate vocabulary of "open French" with operation result of 3.67 higher than the score threshold. In another example, when the score threshold is set to 2, the determination module 28 selects both the candidate vocabulary of "open French" with operation result of 3.67 and the candidate vocabulary of "open fridge" with operation result of 2.46.

In step 250, the determination module 28 stores at least one output result that is greater than the score threshold to the first database DB1.

In one embodiment, an output result can be a subset of multiple operation results. More specifically, the determination module 28 regards all the operation results that are greater than the score threshold as at least one output result.

In one embodiment, the determination module 28 determines whether each of the operation results is greater than a score threshold (step 240) and stores the output results to the first database DB1 (step 250). An output result can be the candidate vocabulary that corresponds to an operation result that is greater than the score threshold. When the determination module 28 determines that none of the operation results is greater than the score threshold, the speech correction method 200 is terminated after step 240 is performed.

For example, when the score threshold is set to 3, the determination module 28 determines that only the operation result 3.67 of the candidate vocabulary of "open French" is greater than the score threshold, so the output result of "open French" is stored to the first database DB1 (since the operation result of this candidate vocabulary is higher than the score threshold, "open French" is regarded as the output result).

In another example, when the score threshold is 2, the determination module 28 determines that the operation score 3.67 of the candidate vocabulary "open French" and the operation score 2.46 of the candidate vocabulary "open fridge" are greater than the score threshold. Therefore, the output results "open French" and "open fridge" both are stored to the first database DB1.

The purpose of storing candidate vocabulary that is greater than the score threshold to the first database DB1 is that the determination module 28 treats the candidate vocabularies (each of the at least one output result) as having the same correct semantic meaning. In this example, the determination module 28 regards the output results of "open French" and "open fridge" as having the same meaning as the correct semantic meaning (which means to enable a specific application, such as enabling a refrigerator management application). In other words, regardless of whether the user's voice input is recognized as "open French" or "open fridge", the determination module 28 will treat the voice inputs of "open French" or "open fridge" as the correct command to enable a specific application.

In a specific embodiment, a plurality of voice inputs are received in step 210 first, and then steps 220 to 230 are performed. Alternatively, step 210 may be performed to receive a voice input, then steps 220 to 230 are performed, and then the method returns to step 210 to receive next voice input. Steps 210 to 230 are repeated in sequence until the voice inputs have been accepted a predetermined number of times of voice inputs, for example, 5 times.

Figure 3:
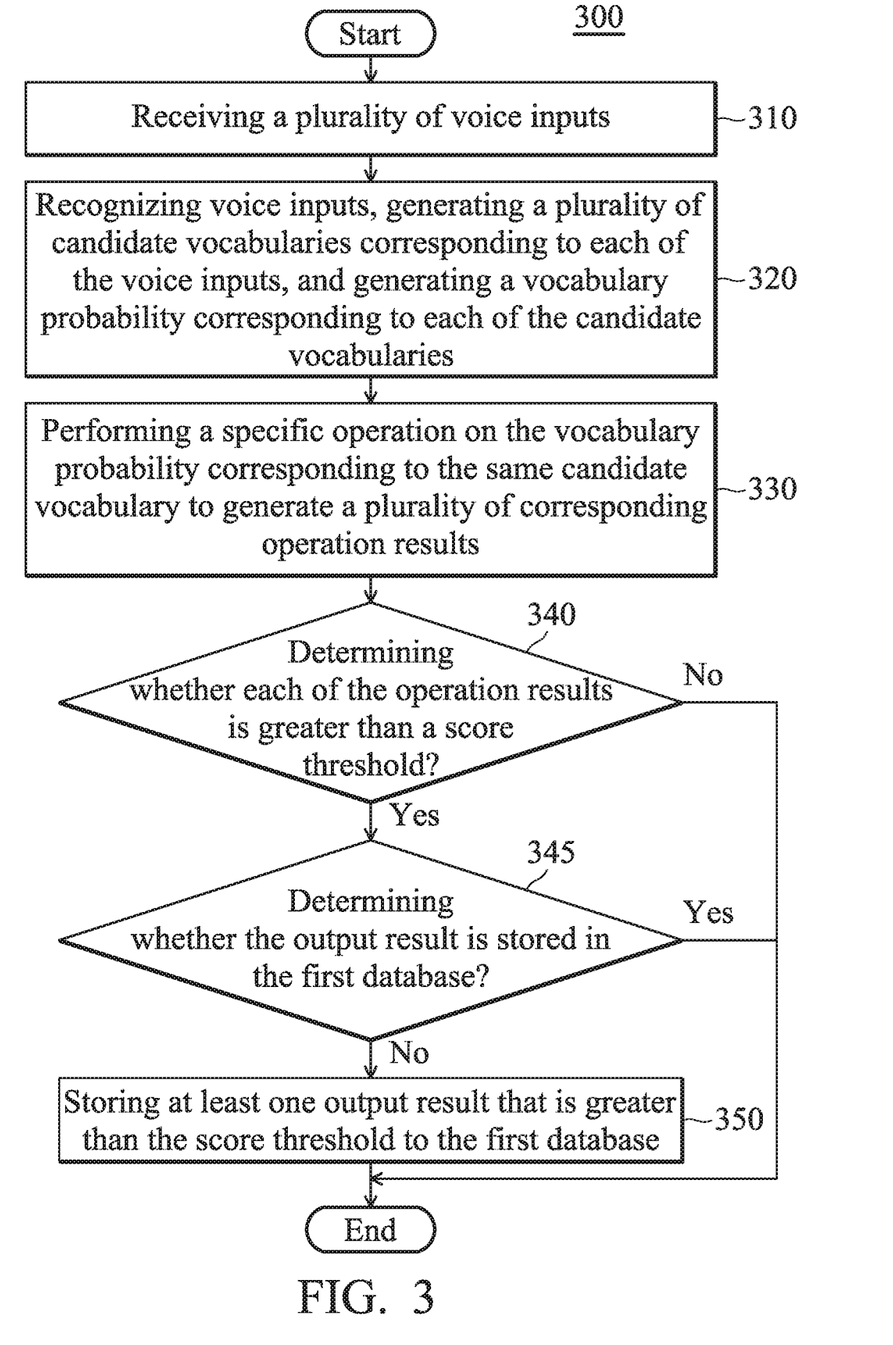
FIG. 3 is a flow chart of a speech correction method according to an embodiment of the present invention.

FIG. 3 is a flow chart of a speech correction method 300 according to an embodiment of the present invention. The difference between FIG. 3 and FIG. 2 is that FIG. 3 further includes step 345. Steps 310, 320, 330, 340, and 350 of FIG. 3 are the same as steps 210, 220, 230, 240, and 250 of FIG. 2, respectively, and therefore these steps will not be described below.

When the determination module 28 determines that the candidate vocabulary is greater than the score threshold value (step 340), at least one output result may be obtained, and then step 345 is performed. The output result may refer to a candidate vocabulary that corresponds to an operation result that is greater than the score threshold.

In step 345, the determination module 28 determines whether the output result is stored in the first database DB1. If the determination module 28 determines that the output result is not stored in the first database DB1, then the output result is stored to the first database DB1. If the determination module 28 determines that the output result is stored in the first database DB1, the procedure ends.

Figure 4:
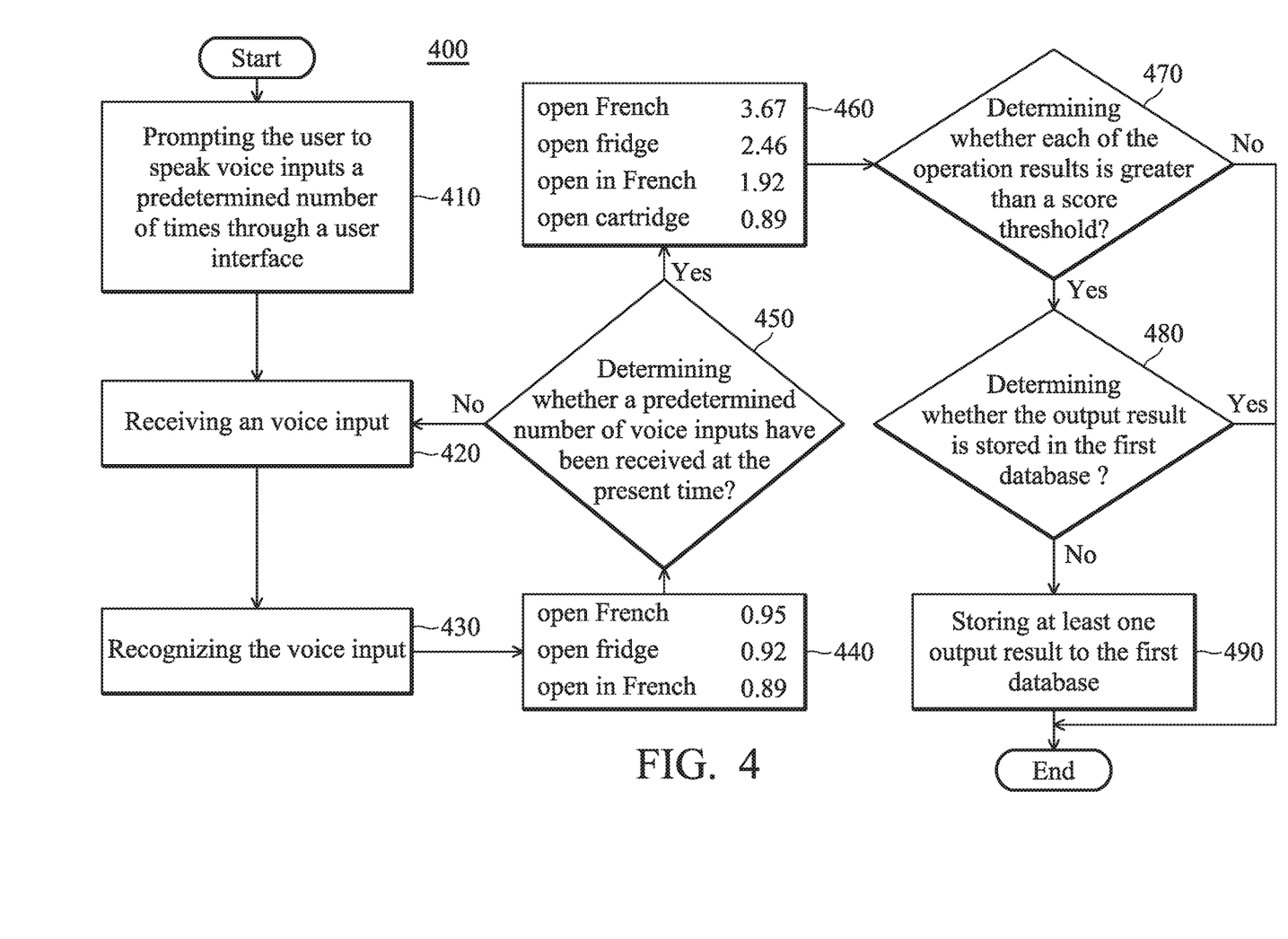
FIG. 4 illustrates an example of applying a speech correction method according to an embodiment of the present invention.

For easier understanding, please refer to FIG. 4, which illustrates an example of applying a speech correction method 400 according to an embodiment of the present invention. In one embodiment, the speech correction method 400 can be applied to a refrigerator management application. However, the invention is not limited thereto, and the speech correction method 400 can be applied to various applications requiring voice Input.

In step 410, the processing device 20 can prompt or instruct the user to speak voice inputs a predetermined number of times through a user interface. For example, the user interface shows "please say "open fridge" 5 times". The predetermined number of times is not limited thereto, and it can be any positive integer. The voice input can be associated with a command ("open fridge") of an application, such as enabling a specific application.

In step 420, the audio receiver 22 is configured to receive the voice input. For example, the audio receiver 22 receives a first voice input.

In step 430, the speech recognition engine 24 recognizes the voice input (e.g., the first voice input).

In step 440, the speech recognition engine 24 generates one or more candidate vocabularies corresponding the voice input (e.g., the first voice input) and generates vocabulary probabilities corresponding to each of the candidate vocabularies. For example, the speech recognition engine 24 generates three candidate vocabularies corresponding to the first voice input. The three candidate vocabularies include "open French", "open fridge" and "open in French". The vocabulary probability corresponding to "open French" (candidate vocabulary) is 0.95, the vocabulary probability corresponding to "open fridge" (candidate vocabulary) is 0.92, and the vocabulary probability corresponding to "open in French" (candidate vocabulary) is 0.89.

In step 450, the determination module 28 determines whether a predetermined number of voice inputs have been received at the present time. For example, if the predetermined number of times is 5, the determination module 28 determines that only one voice input has been received at present, which has not reached the predetermined number of times, then returns to step 420. If the determination module 28 determines that the voice input has been received 5 times, the predetermined number of times (5 times) has been reached, and step 460 is performed.

That is, when the predetermined number of times is 5, it means that the foregoing steps 420-440 need to be performed 5 times in sequence to obtain one or more candidate vocabularies corresponding to the first voice input to the fifth voice input and their respective one or more candidate vocabularies.

In step 460, the calculation module 26 performs a specific operation on the vocabulary probabilities corresponding to the same candidate vocabulary, to generate a plurality of corresponding operation results. For example, after recognizing the five voice inputs spoken by the user, all the candidate vocabularies generated by the speech recognition engine 24 include 3 times of "open fridge", 5 times of "open French", 3 times of "open in French", and 2 times of "open cartridge". Then, the calculation module 26 adds the vocabulary probabilities corresponding to the same candidate vocabulary. That is, the sum of the vocabulary probabilities corresponding to the "open fridge" is 2.46 (the 5 recognition results include recognizing the voice input as "open fridge" 3 times, and the vocabulary probabilities corresponding to the 3 recognition results are respectively 0.82, 0.81 and 0.83. The value obtained by adding these 3 values is 2.46). The sum of the vocabulary probabilities corresponding to "open French" is 3.67 (the 5 recognition results include recognizing the voice input as "open French" 5 times, and the vocabulary probabilities corresponding to the 5 recognition results are respectively 0.73, 0.81, 0.82, 0.70 and 0.61. The value obtained by adding these 5 values is 3.67). The sum of the vocabulary probabilities corresponding to "open in French" is 1.92 (the 5 recognition results include recognizing the voice input as "open in French" 3 times, and the vocabulary probabilities corresponding to the 3 recognition results are respectively 0.64, 0.64 and 0.64. The value obtained by adding these 3 values is 1.92). The sum of the vocabulary probabilities corresponding to "open cartridge" is 0.89 (the 5 recognition results include recognizing the voice input as "open French" 2 times, and the vocabulary probabilities corresponding to the 2 recognition results are respectively 0.49 and 0.40. The value obtained by adding these 2 values is 0.89).

In step 470, the determination module 28 determines whether each of the operation results is greater than a score threshold. For example, when the score threshold is set to 3, the determination module 28 determines that only the operation result 3.67 of the candidate vocabulary "open French" is higher than the score threshold. The determination module 28 regards "open French" as the output result since the operation result of the candidate vocabulary "open French" is 3.67, which is higher than the score threshold of 3. This step is similar to step 240 in the foregoing FIG. 2 and step 340 in FIG. 3, and therefore it will not be described here any further.

In step 480, the determination module 28 determines whether the output result is stored in the first database DB1. If the determination module determines that the output result is not stored in the first database DB1, step 490 is performed. If the determination module determines that the output result is stored in the first database DB1, the procedure ends.

In step 490, the determination module 28 stores at least one output result to the first database DB1.

Figure 5:
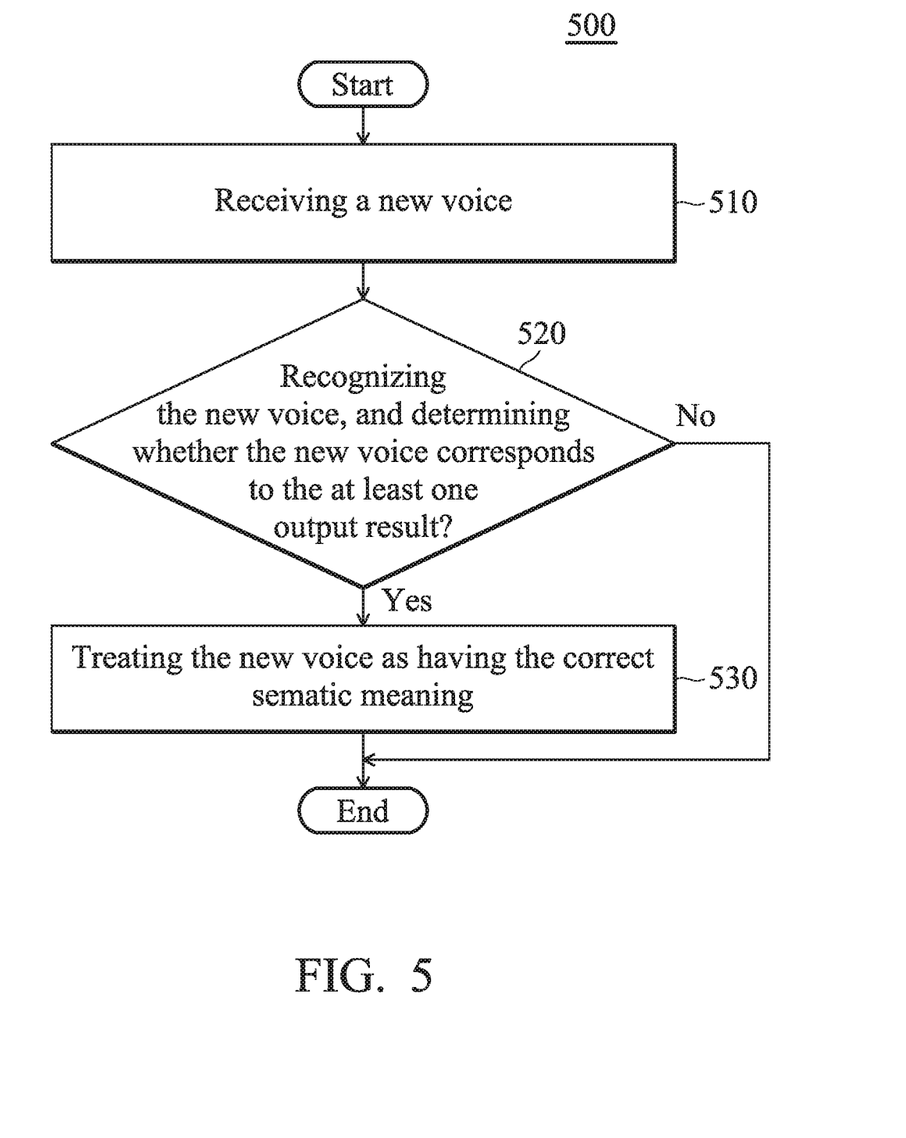
FIG. 5 is a flow chart of a speech correction method according to an embodiment of the present invention.

Please refer to FIG. 5, which is a flow chart of a speech correction method 500 according to an embodiment of the present invention. It should be noted that, preferably, the execution of FIG. 5 can be performed after the execution of FIGS. 2-4. That is, the first database DB1 has stored at least one output result.

In step 510, if the user wants to enable a specific application and speak a new voice of "open fridge" (the user wants to say "open fridge" to enable a specific application), the audio receiver 22 receives the new voice.

In step 520, the speech recognition engine 24 recognizes the new voice, and the determination module 28 determines whether the new voice corresponds to the at least one output result. If the determination module 28 determines that the new voice corresponds to one of the output results, or corresponds to a default command, step 530 is performed. If the determination module 28 determines that the new voice does not correspond to any output results or does not correspond to a default command, the procedure ends.

When the speech recognition engine 24 correctly recognizes the new voice "open fridge" as the default command "open fridge", the specific application is enabled. When the speech recognition engine 24 recognizes the new voice "open fridge" as "open French", although the recognized voice "open French" does not match the default command "open fridge", the specific application would be still enabled if the at least one output result stored in the first database DB1 contains "open French" (step 520). In other words, the determination module 28 will still treat "open French" as having the correct semantic meaning (step 530).

In other words, since the first database DB1 has stored the default command "open fridge" and the output result of "open French" in the procedures illustrated in FIGS. 2 to 4, the determination module 28 regards the output result of "open French" and the default command "open fridge" as having the same correct semantic meaning (i.e., which means to enable a specific application, such as a refrigerator management application).

Although the recognition result "open French" of the new voice does not correctly being recognized as "open fridge" spoken by the user, the recognition result of the new voice "open French" could correspond to the at least one output result stored in the first database DB1, which is described in step 490 of FIG. 4. Thus, the determination module 28 also regards the recognition result "open French" of the new voice as having the correct semantic meaning. In other words, the determination module 28 treats the recognized result of "open French" as "open fridge". In this example, the command "open fridge" represents a voice command for enabling a specific application.

Based on the above, even if the accent of each user is slightly different, the speech correction system 100 can be adapted to the different accents of each user shown in FIG. 4. When a user inputs a new voice (step 510 of the speech correction method 500 shown in FIG. 5), the speech correction method 500 recognizes the new voice and determines whether the new voice corresponds to at least one output result (step 520). If yes, step 530 is performed to treat the new voice as correct semantic meaning. If not, the procedure ends.

The voice command for a particular application may have multiple commands, such as "open fridge", "get an apple", "put an egg", etc. In one embodiment, in order to speed up to make a determination, the storage device 10 further includes a second database and/or a third database. The storage device 10 may further decide to store at least one output result to the first database DB1, the second database or the third database according to different commands. For example, the first database DB1 stores the first command "open fridge" and at least one corresponding output result (such as "open French" as mentioned above). The second database stores the second command "get an apple" and at least one corresponding output result. The third database stores the third command "put an egg" and at least one corresponding output result.

In one embodiment, when the audio receiver 22 receives a new voice, the speech recognition engine 24 recognizes the new voice to obtain the recognition result. When the determination module 28 determines that the recognition result is closer to the second command "get an apple", it only needs to check in the corresponding second database whether there is a corresponding second command or at least one output result. As such, it is not necessary to compare the recognition result with all the commands and the at least one output results in the database, thereby reducing the time it takes to make a determination and freeing up computing resources.

The speech correction system and the speech correction method of the present invention can recognize new voices according to different accents. It can provide customized semantics for different users. In addition, by storing the output results in different databases through different commands, the efficiency of recognizing the semantic meaning that the user really wants to express can be improved when a new voice is recognized.

What is claimed is:

1. A speech correction system, comprising:
a storage device, configured to store a first database; and
a processing device, comprising:
an audio receiver, configured to receive a plurality of voice inputs;
a speech recognition engine, configured to recognize the voice inputs, generate a plurality of candidate vocabularies corresponding to each of the voice inputs, and generate a vocabulary probability corresponding to each of the candidate vocabularies;
a calculation module, configured to perform a specific operation on the vocabulary probabilities corresponding to the same candidate vocabulary, to generate a plurality of corresponding operation results; and
a determination module, configured to determine whether each of the operation results is greater than a score threshold, and store at least one output result that is greater than the score threshold to the first database;
wherein the determination module is further used for determining whether the at least one output result is stored in the first database, and if the determination module determines that the at least one output result is not stored in the first database, the at least one output result is stored to the first database.

2. The speech correction system of claim 1, wherein each of the output results is a candidate vocabulary corresponding to an operation result that is greater than the score threshold; and the determination module treats each of the output results as having a correct semantic meaning.

3. The speech correction system of claim 2, wherein when the audio receiver receives a new voice, the speech recognition engine recognizes the new voice, and the determination module determines whether the new voice corresponds to the at least one output result, and if the determination module determines that the new voice corresponds to the at least one output result, the determination module treats the new voice as having the correct semantic meaning.

4. The speech correction system of claim 1, wherein the calculation module performs the specific operation to add or calculate an average value of the vocabulary probabilities corresponding to the same candidate vocabulary.

5. The speech correction system of claim 1, wherein the score threshold is obtained by multiplying the number of times the voice inputs are received by a confidence level.

6. A speech correction method, comprising:
receiving a plurality of voice inputs;
recognizing the voice inputs, generating a plurality of candidate vocabularies corresponding to each of the voice inputs, and generating a vocabulary probability corresponding to each of the candidate vocabularies;
performing a specific operation on the vocabulary probabilities corresponding to the same candidate vocabulary, to generate a plurality of corresponding operation results; and
determining whether each of the operation results is greater than a score threshold, and storing at least one output result that is greater than the score threshold to a first database;
determining whether the at least one output result is stored in the first database, and if the at least one output result is not stored in the first database, the at least one output result is stored to the first database.

7. The speech correction method of claim 6, further comprising:
receiving a new voice; and
determining whether the new voice corresponds to the at least one output result.

8. The speech correction method of claim 6, wherein the specific operation adds or calculates an average value of the vocabulary probabilities that correspond to the same candidate vocabulary.

9. The speech correction method of claim 6, wherein the score threshold is obtained by multiplying the number of times the voice inputs are received by a confidence level.

* * * * *